Patented July 11, 1944

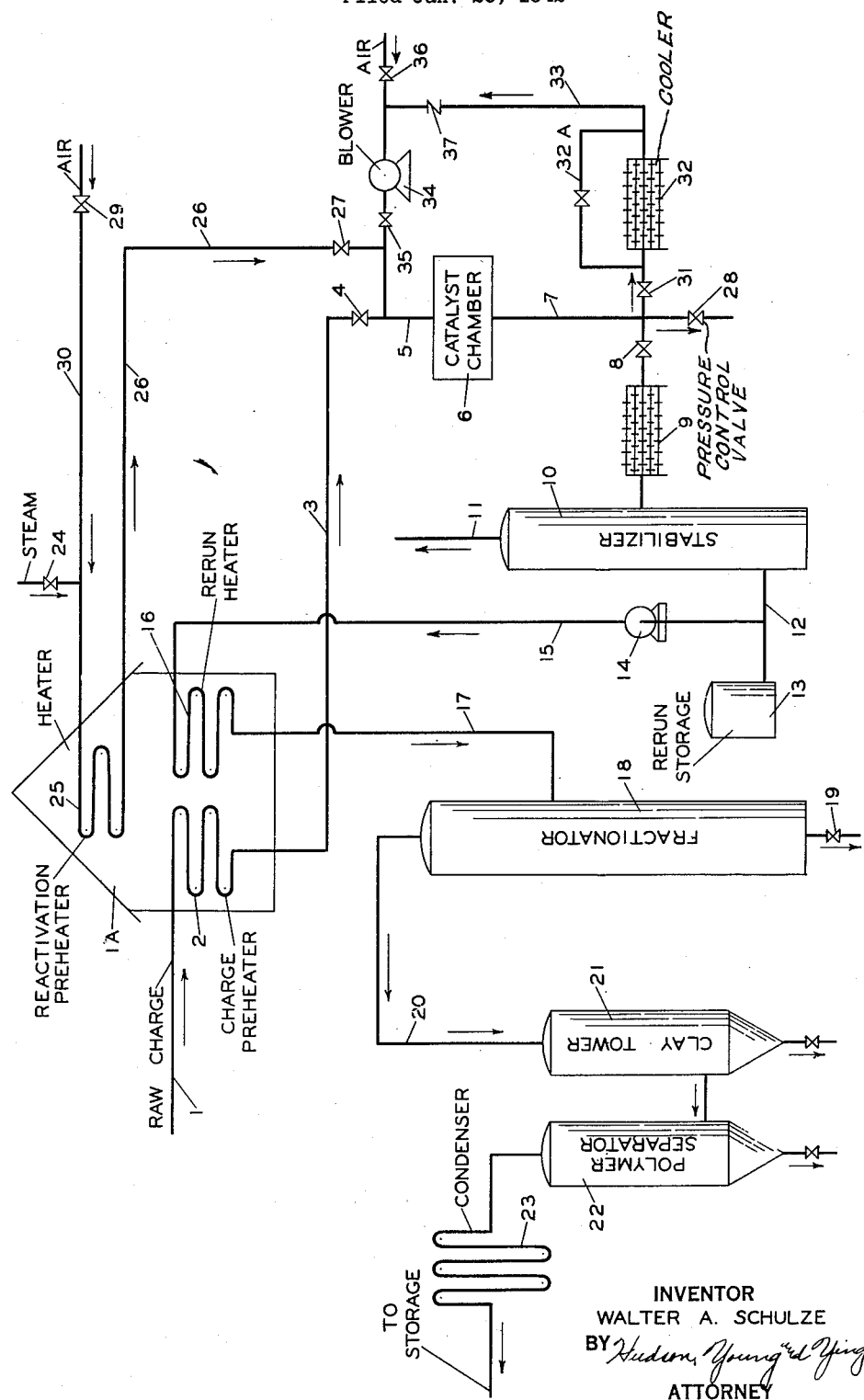

2,353,508

UNITED STATES PATENT OFFICE 2,353,508

PROCESS FOR REACTIVATION OF CATALYSTS

Walter A. Schulze, Bartlesville, Okla., assignor to Phillips Petroleum Company, a corporation of Delaware Application January 26, 1942, Serial No. 428,287

8 Claims. (Cl. 196—52)

The invention relates to the catalytic treatment of hydrocarbons over solid contact catalyst masses to promote conversions including cracking, reforming, desulfurization and the like. More specifically this invention relates to a method and process for the reactivation of catalyst masses employed in said conversions and which are more or less progressively inactivated by the deposition of carbon and/or carbonaceous material on the catalyst particles.

In catalytic conversions of the type indicated, the conditions of treatment are such that carbonaceous materials are formed and deposited on the catalyst mass, thereby impairing the catalyst activity. While the amount of carbonaceous material deposited may vary widely with the type of hydrocarbon stock undergoing conversion and with the conditions of treatment, the ultimate result is a decrease in conversion to an economically unsatisfactory level. Thus, periodic reactivation of the catalyst mass becomes necessary in order to maintain a standard or average for the conversion and/or for the quality of the product.

The frequency of reactivation in the various catalytic processes for treating hydrocarbon oils may vary rather widely since the relative rates of deposition of deactivating material are of quite different orders. Thus, while certain heavy oil cracking processes operated at 900 to 1000° F. may require catalyst reactivation at intervals of one hour or less, milder treatments of more refractory stocks such as gasoline desulfurization at temperatures of 700 to 800° F. may operate for periods ranging from 12 hours to a week or more before reactivation is required.

In the case of processes requiring catalyst reactivation at frequent intervals, it is justifiable to incorporate into the plant design a multiplicity of catalyst chambers and an elaborate system of reactivation equipment so that a regular cycle of processing and reactivating operations is possible. A large proportion of investment and operating costs may thus be included in reactivation equipment and control devices and operation.

At the other extreme are processes wherein the reactivation is so infrequent that a choice may be made between reactivation and replacement of the spent catalyst on the basis of comparative costs. And between these extremes are the cases wherein the frequency of reactivation justifies the installation of some form of reactivation equipment but limits the design and operation of said equipment to reasonably simple and inexpensive form. These latter processes may include gasoline desulfurization and reforming and catalytic cracking wherein the processing or conversion period is as long as about 12 hours. It is to this type of process that the present invention has particular application, although the broad principles thereof are adaptable to wider application, and to reactivation of any catalyst which has become inactivated and laden with combustible material in catalytic conversions generally, and especially conversions of hydrocarbons.

In such processes relatively large catalyst masses are ordinarily employed because flow rates of hydrocarbon vapors are not excessive. Thus, large pressure drops due to high space velocity and/or over-conversion due to critical contact times are not unusually encountered and large beds of catalyst in vessels of simple design are practical. Many of the catalysts employed are the natural adsorbent earths and mineral ores and natural or synthetic metal oxides or mixtures thereof. Such contact masses are adaptable to reactivation in relatively large masses without disintegration or deterioration as long as excessive temperatures above about 1300 to 1400° F. are avoided.

The reactivation of solid catalyst masses involves the controlled combustion of the carbonaceous deposits by the passage of an oxygen-containing gas at or above the ignition temperature of said deposits. In its simplest aspects, reactivation thus comprises initiating combustion by achieving ignition temperatures in the presence of oxygen and thereafter controlling the combustion by limiting the amount of oxygen reaching the combustion zone. This latter operation prevents excessive combustion temperatures generated by the exothermic combustion reactions. Other auxiliary operations comprise initial and final purging of the catalyst space to remove volatile hydrocarbon residues prior to reactivation and oxygen-containing gases subsequent to reactivation.

The principal object of the present invention is to provide an improved process of reactivating a catalyst which has become spent in the manner indicated above. Another object is to use a simplified means of effecting the steps of catalyst reactivation. A further object is to restore the activity of solid catalyst masses by a series of operations utilizing a minimum of strictly reactivation equipment. It is a still further object to effect catalyst reactivation at low cost and under conditions such that a minimum of operating control is required. Still another object is to provide an improved composite method of catalytic hydrocarbon conversion including an improved regeneration procedure. Numerous other objects will hereinafter appear from a consideration of this description taken in conjunction with the accompanying drawing which portrays diagrammatically one form of apparatus which has been advantageously employed in carrying out the process of the present invention as applied to a gasoline or light oil treatment which may be catalytic desulfurization or reforming or the like.

I have discovered that the periodic reactivation of contact catalysts employed in many conversion processes may be effected by utilizing as far as possible the facilities normally provided for the conversion operation, and thereby supplying only a few elements of auxiliary equipment. Further, the temperature and pressure conditions of reactivation by my process are mild so that conventional metals and fabrication are satisfactory. Also, my process provides both simplicity and economy by eliminating such elements as separate means for generating inert atmospheres and means for controlling the concentrations of various components of recycled combustion gases.

In one embodiment the process of the present invention may involve the following steps:

1. Purging the catalyst with superheated steam at a temperature of from about 800° to about 1000° F. to remove substantially all volatile material therefrom, mainly hydrocarbons, and prepare the catalyst for regeneration. Usually the temperature of the steam is at or above the temperature at which the hydrocarbon was converted over the catalyst. Generally a temperature of 900° F. is used. The superheating to the proper temperature is preferably accomplished in an auxiliary preheating coil located in the upper portion of a processing heater.

2. Initiating combustion in the catalyst by introducing a mixture of superheated steam and air containing oxygen in amount not over about 10% by volume but sufficient to cause ignition and at a temperature between about 800° and about 1000° F. Usually this is accomplished by introducing air in the proper amount to the steam feed to the preheater. Generally a temperature of 900° F. is employed for this mixture. As soon as combustion begins the temperature of the effluent sharply rises above that of the infeed to a level of at least 1000° F. and frequently higher say to 1200° or 1300° F.

3. As soon as the ignition has been effected the introduction of steam and air is stopped and recycling or circulation is commenced, the major portion of the effluent gas being recycled through a cooler designed to reduce its temperature appropriately. The balance of the effluent is vented from the system and not recycled. Air is introduced to the recycled effluent before or after the cooler or the recirculating blower. The temperature to which the recycled effluent is cooled in the cooler, the temperature of the added air, and the amount of added air are so regulated that the infeed to the catalyst is at such a temperature and of such oxygen content that the combustion temperaure in the catalyst is kept within proper limits namely substantially above 900° F. but not above about 1400° F. Usually conditions are so adjusted that this temperature throughout the major portion of the recycling is kept between about 1200° F. and about 1300° F. Either cold or preheated air may be employed as make-up gas. In general the temperature of the infeed will be at between about 800° and about 900° F. and its oxygen content between about 2% and about 10%.

Conditions are thus maintained until the temperature of the effluent gas drops to a predetermined level substantially below the maximum attained, usually to about 1100° F. indicating that the major part of the combustible material has been burned off and that the exothermic heat of regeneration is much less.

4. Thereupon the cooling of the recycled effluent gas is reduced either gradually or abruptly and recycling of the effluent is continued. By reducing the cooling in this manner either partially or completely the temperature is prevented from dropping below 900° F. and is maintained thereabove. In many cases complete discontinuance of cooling at this stage is necessary, although in some cases by appropriate adjustment of the temperature and oxygen content of the infeed by control of the temperature and amount of the added air the desired maintenance of combustion temperature may be effected.

These conditions are maintained as long as it is possible to maintain the desired combustion temperature thereby. Normally this point is reached when the circulated gas has attained essentially the composition of air or closely approached the oxygen content of air, say at least 15%. This indicates that very little combustible deposit is left on the catalyst.

5. Thereupon the addition of air to, and venting of effluent gas from, the system are discontinued but recycling is continued to burn out any remaining combustible. This serves to conserve heat and maintain the combustion temperature at at least about 900° F.

Alternatively, or in addition to the procedure of the last paragraph, preheated air at say from about say 800° to about 1000° F., and usually at about 900° F., may be passed through the catalyst to remove the last traces of combustible. In many cases such a step alone may serve to maintain the desired combustion temperature of at least about 900° F. When such a step is used, it is usually employed in place of the continued recycling in a closed system described in the last paragraph, recycling being stopped. If desired, however, it may follow the recycling in a closed system.

Frequently it is desirable that step 5 comprise or consist of continued recycling with addition of preheated air at 800–1000° F. to maintain the temperature of combustion at the indicated level.

6. Recycling is stopped and the catalyst is purged with air, preferably heated to from about 800° to about 1000° F., and usually about 900° F. to remove the carbon dioxide and any carbon monoxide.

7. This step is followed by purging with superheated steam at from about 800° to about 1000° F., and generally 900° F., to remove all traces of oxygen and any remaining traces of carbon dioxide or monoxide.

The catalyst is now ready for re-use. If desired the steam may be purged with any suitable hydrocarbon gas, such as $C_4$ or lighter, where the catalyst is not to be placed on-stream at once.

In accordance with my invention the steam and/or air heated to from about 800° to about 1000° F. required in carrying out the invention is brought to this temperature in an auxiliary heating coil of relatively small capacity compared to the main reactivating gas stream and compared to the hydrocarbon stream. This coil may advantageously be located in the processing heater used in the conversion process. For example it may be located above one or more hydrocarbon heating coils of relatively large capacity in the same furnace shell in such manner that it is heated by the heating gases passing upwardly from such coils. Generally the gas volume supplied by this auxiliary heating coil will not exceed about 25% of the volume of gas recirculated in the main combustion period of the regeneration procedure described above.

My process is advantageous because the recirculation of effluent combustion gas in relatively large volumes is employed during only from about 50 to about 75 per cent of the reactivation period. Thus the expense of handling large volumes of gas throughout the reactivation period is avoided and at the same time the reactivation is accomplished just as rapidly as, or more rapidly than, when using prior processes. In general the period of regeneration does not exceed, and frequently is less than, the period of on-stream operation. At the same time by the use of superheated steam for initial purging and a mixture of superheated steam and air followed by regeneration by recycling, purging with air and then with steam, I am enabled to better reactivate in a simple and economical manner. By preheating the superheated steam and/or the air in a small heating coil disposed in an otherwise unused portion of the main heating furnace great economies and simplification of construction and operation result. The arrangement of apparatus and the sequence of steps described herein make possible efficient regeneration in a manner giving new and hitherto unattainable efficiency and convenience. My invention effects very substantial economies in equipment and in energy utilization.

In one specific application my process comprises the steps of (1) purging a catalyst chamber containing catalyst to be reactivated with steam superheated in an auxiliary coil located in a processing heater; (2) igniting the purged mass by means of air heated in the same auxiliary coil; (3) after ignition is accomplished, circulating combustion gas at the ignition temperature and continuously adding air to the circulating stream while venting sufficient of the effluent gas from the combustion to maintain a relatively constant volume for circulation; (4) at the completion of reactivation, repeating step (1) to purge oxygen-containing gases, namely oxygen, carbon dioxide, carbon monoxide, and the like from the catalyst.

The raw charge (such as for example gasoline or light oil) entering through line 1 passes through section 2, of the heater 1A which furnishes preheat for the processing step. The hot vapors then pass through line 3, valve 4 and line 5 to catalyst chamber 6 filled with a solid adsorbent catalyst. The process vapors exit through line 7, valve 8 and cooler 9 to stabilizer 10 where decomposed impurities and/or light gases may be separated and discharged by line 11. The stabilized liquid this is taken through line 12 to floating storage 13 and/or through pump 14 and line 15 to rerun heater section 16. The vapors from section 16 pass through line 17 to fractionator 18 where heavy ends may be removed or a selected boiling-range product separated. The bottoms are removed through valve 19, while the product vapors pass overhead through line 20, clay tower 21, polymer separator 22 and condenser 23 to storage.

At the end of the processing period, the flow of process vapors is either stopped or directed to a fresh catalyst bed, by closing valves 4 and 8, the catalyst is then purged of hydrocarbon vapors by means of superheated steam entering as ordinary plant steam or exhaust steam, by valve 24 from an external supply (not shown) and passing through reactivation preheater coil 25 where it is superheated to any desired temperature, line 26, valve 27 and line 5 and downward through the bed 6. The purge gases are vented through line 7 and valve 28. When hydrocarbons are thus completely removed, and while the catalyst bed is filled with steam, air is introduced through valve 29 and line 30 and passes alone or together with steam through reactivation preheating coil 25, line 26, valve 27 and line 5, and through the catalyst chamber 6; from chamber 6 the gases exit through line 7 and valve 28, with the latter open for venting.

This oxygen-containing gas introduced at or near combustion temperatures ignites the carbonaceous material on the catalyst. When combustion has started, the exothermic heat liberated makes further heating of inlet gas unnecessary, and valves 24, 29 and 27 are closed and gas addition through the reactivation preheater 25 is discontinued. Valve 28 is also partly closed to maintain constant pressure. Valves 31 and 35 are opened and circulation of combustion gases from the catalyst chamber is started through line 7, valve 31, cooler 32, line 33, blower 34, valve 35 and line 5. Combustion proceeds with the catalyst bed at a temperature controlled by the cooler and the rate of air addition through valve 36 ahead of the blower 34. A constant gas volume is maintained by venting gas through valve 28 at a rate equivalent to that at which air is added through valve 36. Cooler 32 may be operated in such manner as to produce uniform temperatures at the blower inlet and thus further aid in maintaining the combustion temperature in the catalyst bed at the proper level and also avoid excessive operating temperatures for the blower.

When the major proportion of the combustible material has been burned from the catalyst, the heat of combustion will be greatly decreased and the cooler 32 may no longer be required. Also at this stage the rate of oxygen consumption will fall rapidly, and oxygen concentrations approaching that of air may be built up in the circulating gas stream as air addition is continued. The increased oxygen concentration is not harmful at this point, and may expedite the final stages of reactivation. After maximum oxygen concentrations have been obtained, i. e. when essentially air is being circulated, the air addition through valve 36 may be stopped and valve 28 closed to prevent further heat loss from the system.

With especially refractory carbon deposits, the final stages of reactivation may be conducted with air admitted by line 30 and preheated in auxiliary coil 25 being added via line 26 and valve 27 to the circulating gas stream at high temperatures, while a corresponding volume of the stream is vented by valve 28. Still another method for finishing the reactivation is to stop the gas circulation and to pass preheated air from the coil 25 through the catalyst bed to vent through valve 28. Any of these alternatives may be employed depending on the time available for removing the last traces of carbon and on the comparative operating costs. The process provides unusual flexibility with regard to the time required for the various phases of reactivation.

When the reactivation is complete, the catalyst chamber is purged again to remove oxygen-containing gases i. e., $CO_2$, $CO$, $O_2$, etc. This is done by stopping the blower 34, closing valves 31 and 35, opening valves 24, 27 and 28 and passing superheated steam through the reactivation preheater 25 and through the catalyst bed 6. The catalyst is then ready for further service in the processing operation, and the hydrocarbon vapors may be admitted while the catalyst bed is at or near conversion temperature. As implied above, the final purge with superheated steam may if desired be preceded by a purge with air admitted via valve 29, line 30 and heating coil 25, line 26 and valve 27, and vented via line 7 and valve 28, to remove carbon dioxide and/or any carbon monoxide from the catalyst. The final purge with superheated steam would then remove all traces of free $O_2$ introduced by such an air purge. Cooler 32 may be by-passed as desired by the line 32A.

In some cases it may be desirable to have the reactivating combustion proceed through the catalyst mass in a direction opposite to the flow of hydrocarbons in the processing step. In such instances, the apparatus diagrammed may be utilized by providing the necessary gas lines to introduce the igniting gas mixture at the bottom of the catalyst bed 6, and to be vented at the top. Combustion gases would be subsequently circulated from the top of the bed to a cooler and from the blower 34 to the bottom of the bed 6. This arrangement in effect reverses the illustrated relative position of cooler 32 and blower 34 while the combustion proceeds upward through the catalyst bed.

It will be understood that the air and steam supplied by way of valves 29, 36 and 24 are under a pressure sufficient to force them into the circulating system comprising line 5, catalyst chamber 6, line 7, line 33, blower 34, etc. The air entering by way of valve 29 and line 30 is under sufficient pressure to cause it to pass into admixture with any steam entering through valve 24 and to pass through preheating tubes 25. Commonly the air supplied to valves 29 and 36 has been compressed to a fairly high pressure and the steam supplied to valve 24 is likewise under fairly high pressure.

The check valve 37 prevents reverse flow in line 33.

While the reactivation preheater has been illustrated as the preferred form of construction consisting of an auxiliary tube system 25 located in the upper portion of the main processing furnace 1A, a separate small furnace may be provided if desired for preheating the air and superheating the steam passing into line 26. Also, the reactivation preheater may be a part of the processing preheater. The arrangement illustrated is of particular flexibility, and the heat may be provided by burners in any appropriate section of the furnace 1A. If desired the reactivation preheating tubes 25 may be located in the roof of a rerun heater 16 separate from the processing heater 2, or in the roof of a processing heater 2 separate from the rerun heater 16 as where no rerun heater is employed. Preferably the arrangement shown is used wherein the preheater 25 is located above the processing preheater 2 and the rerun heater 16 all being located in a common heater.

The reactivation preheater 25 need not be large because the volume of gases handled is relatively small in comparison with the total volume of reactivating gases circulated during reactivation. Also the preheater 25 is in use during only a small fraction of the reactivation period. When not in use, damper devices of suitable design may be provided to prevent the passage of hot stack gas over the idle tubes 25.

In this system, the large volumes of reactivating gas are handled only in a small portion of the system, and the equipment size and cost are correspondingly reduced. This arrangement requires large-diameter gas lines only in the circuit including the catalyst chamber 6, cooler 32 and blower 34, and other equipment may be relatively small size. Steam and air in the small initial volumes required are ordinarily available in the plant or refinery under moderately high pressures so that no recompression steps are ordinarily needed to force them into the system. The pressure of the reactivating gases in the circulation stage is limited only by the working pressure of the blower and catalyst chambers and may be regulated to any desired value lower than the available air and steam pressures. Operation at moderately high pressures of 15 to 150 pounds gage is usually preferred to reduce the apparent volume of gases handled by the circulatory system.

In carrying out the various steps of the reactivation process, the initial purge with steam is done at temperatures at or even above the conversion temperature. This is accomplished by employing steam heated to 800–1000° F. and usually not allowing the catalyst bed to cool after the flow of hydrocarbon vapors is stopped. When air is introduced following the initial purge, the bed is still near ignition temperatures, and the steam-air mixture quickly begins the reactivating combustion.

When the combustion is started, the temperature of the effluent gases quickly rises from about 900° F. to higher values approaching 1200 to 1300° F., and circulation of the combustion gases through the cooler and blower is started. The extent of cooling may lower the circulating gas temperature to about 800 to 900° F., and the amount of air added to the circulating stream is limited to prevent combustion temperatures exceeding about 1300 to 1400° F., which may result in permanent injury to the catalyst through alteration of its physical and/or catalytic characteristics. This temperature differential and control of air addition is maintained throughout the primary combustion period. During this operation, as air is added and gases are vented, the original high steam content may be gradually reduced to values corresponding to the water vapor formed by the combustion.

When the primary combustion period is over and the intense heat zone or combustion front has passed through the catalyst bed in the direction of gas flow, the temperature of gases leaving the bed will begin to fall. The extent of cooling is similarly reduced, and the reactivating gas stream is held above about 900° F. during the final stages of combustion. During this final period the circulated gases are effectively air, and cold air addition and gas venting may be stopped to conserve heat and/or additional air may be furnished at 900 to 1000° F. through the preheater system to maintain a temperature range which hastens the removal of the last traces of carbon from the catalyst granules.

The final purge is done with steam at or near 900° F., and the water content of the catalysts is affected only slightly by water vapor at these temperatures. When the purge is complete, the hydrocarbon vapors may again be introduced for processing without allowing the catalyst bed to cool.

If immediate service is not required, and the catalyst chamber is allowed to cool appreciably before use, the steam may be swept out with fuel gas or some suitable hydrocarbon gas. This operation prevents condensation of water vapor within the catalyst bed. In some instances, the hydrocarbon gases produced in the stabilization operation, and ordinarily comprising $C_4$ and lighter hydrocarbons may be utilized for such a flushing operation to remove steam from the reactivated chamber. Said gases are refractory at the temperatures prevailing in the bed, and may be introduced in sufficient quantity to flush out the steam and to compensate for changes in the chamber pressure as the catalyst mass cools. The gas may be given a chemical treatment prior to introduction into the catalyst chamber, if desired, to remove hydrogen sulfide present as a result of the catalytic conversion.

I have noted that the activity of the usual types of catalyst reactivated by this process is not much affected by the use of steam at either the beginning or the end of reactivation. After the final purge with steam, some water may be retained by the catalyst and this is driven out during the first of the processing period. In this dehydration period the catalyst activity may be somewhat lower, but the time involved is only a small fraction of the total time on stream, and the loss of conversion is insignificant. In fact, the initial activity of the reactivated catalyst may be beneficially altered enough to reduce coke deposition during the first contact of hydrocarbon vapors with the reactivated catalyst, and the average conversion is thereby made more uniform and the processing period somewhat lengthened.

While the initial purge to remove hydrocarbon vapors may be safely terminated in most cases after about 30 or more volumes of steam have been passed per volume of catalyst, it is beneficial to continue this steam purge as long as possible without allowing the bed temperature to fall below about 800° F. The steam in addition to removing readily volatile hydrocarbons apparently tends to soften coke and tar deposits and gradually remove a part of the heavier material which may cause difficulty by distilling and/or blowing out of the bed in the subsequent circulation of gases at higher velocity and temperatures. These tarry materials may burn cleanly when retained within the catalyst mass, but cause difficulty when atomized and carried out into the cooler, blower, vent valves and other portions of the recycling system.

In general, the catalysts to be reactivated according to the terms of the present process are those which are restored to a suitable activity under the conditions and with the gas compositions specified. Thus, materials temporarily or permanently poisoned or disintegrated by steam may not be successfully handled by the process because of the use of this gas during a portion of the reactivation procedure. However, excellent results are obtained in the reactivation of the so-called clay-type and mineral ore catalysts and the natural or synthetic metal oxides such as alumina, magnesia, zirconia and the like. Especially good results are obtained in the reactivation of bauxite catalysts used in desulfurization, reforming and similar conversions.

The following examples of specific applications of the invention will serve to further illustrate its operation and advantages.

Example I

A catalytic desulfurization unit processing a pressure distillate to produce desulfurized cracked gasoline used a flow similar to that shown in the drawing. Two catalyst cases each containing about 220 cubic feet of bauxite were provided so that continuous operation was obtained. The processing period for each catalyst chamber was 18 hours, and the reactivation required 10 hours. The desulfurization treatment was carried out at 750° F., and the spent chamber to be reactivated was purged with steam after the flow of hydrocarbon vapor was stopped. This plant process steam was admitted to the catalyst bed after passing through a 2 inch pipe preheating coil in the roof of the rerun heater to raise the steam temperature to about 900° F. The steam flow at about 100 cubic feet per minute was downward through the catalyst bed with the purged gases being vented to a flare. This initial purge was completed in about two hours, and air was then added to the steam ahead of the preheater in the volume ratio of about 1:10. The mixture after passage through the preheater was admitted at the top of the catalyst bed at a temperature of about 900° F., and the flow of this mixture was continued until ignition of the combustible deposits was obtained. This ignition was noted by a rapid temperature rise in the top section of catalyst recorded by internal thermocouples. At this point the vent valve was partly closed to maintain constant pressure, and the preheated air-steam mixture was cut off when this pressure was reached. Circulation of the combustion gases through the cooler and catalyst bed was then begun by means of the blower. Air was added at the blower intake at a controlled rate to produce a maximum catalyst bed temperature in the range of 1200 to 1300° F., and the pressure in the circulatory system was maintained at 30 pounds gage at the blower intake by means of the pressure control valve. The cooler was operated to reduce the temperature of the combustion gas stream at the blower intake to about 850° F. The reactivation continued for about six hours under these conditions, with the oxygen content of the circulating stream not exceeding about 2 to 5 per cent at the entry port to the catalyst bed. The circulating gas stream amounted to about 2000 cubic feet per minute at 900° F. and 30 pounds gage pressure, corresponding to a space velocity of about 540 standard gas volumes per hour per volume of catalyst. The pressure drop through the catalyst bed at this gas rate did not exceed 10 pounds. After about six hours, the primary combustion zone had traversed the bed from top to bottom, and the oxygen content of the gas stream rose as the oxygen was incompletely utilized, while the temperature of the gas stream at the catalyst exit port fell slowly. When the temperature at the cooler inlet fell to about 1100° F., the cooling medium was cut off and during the final hour of gas circulation air addition was discontinued because an oxygen content of over 15 per cent was reached. The temperature within the bed during this stage declined to about 900° F.

The blower was shut down and with the vent valve opened, air from the preheater was passed through the catalyst bed at a temperature of 900° F., and at a rate of about 100 cubic feet per minute. When the $CO_2$ content of the effluent became negligible after about one hour, the air was discontinued and steam was passed through the preheater and through the catalyst bed at about 900° F. After 30 minutes when the oxygen-containing gases had been removed from the catalyst space, the steam was cut off, and the catalyst chamber was put back on stream at the end of the processing period of the alternate chamber.

Example II

In a catalytic reforming unit utilizing bauxite catalyst, a processing period of 12 hours was employed in treating straight run naphtha at 1030° F. The catalytically treated vapors were freed of fixed gases and then rerun and clay treated to produce a gum-stable specification gasoline.

The reactivation operations were timed to complete reactivation in slightly less than 12 hours with immediate change to the processing operation. The initial purge was accomplished in one hour with steam superheated to 900° F. in a bank of roof tubes in the rerun heater. The steam was passed through the catalyst at 200 cubic feet per minute, and after the hydrocarbon vapors were completely purged, sufficient air was admixed with the steam ahead of the preheater to produce an oxygen concentration of 5 volume per cent in the mixture leaving the preheater. This mixture at 900° F., was passed into the catalyst bed until combustion started.

After combustion was under way, the circulation of combustion gases through a blower was begun and the gas stream from the preheater was discontinued. The blower circulated 3000 cubic feet per minute of a gas mixture containing initially about 3 volume per cent of oxygen, and a cooler on the blower intake cooled the recycled gas to 800° F. With this control of the oxygen content combustion temperatures did not exceed about 1350° F. As before, cold air was introduced to the recycled portion of the effluent before entering the blower and the balance of the effluent was bled off from the system to maintain essentially constant volume and pressure in the circulating system. The primary combustion period lasted between eight and nine hours, and at the end of this period when the catalyst temperature had fallen to about 1100° F., the cooler was by-passed and air was circulated at about 1000 cubic feet per minute for another hour with sufficient preheated air at 900° F. added to maintain the catalyst bed temperature above about 900° F. Then the blower was shut down and in order to purge the catalyst of carbon dioxide and/or carbon monoxide about 200 cubic feet per minute of preheated air at 900° F. was passed through the catalyst until 30 minutes before the chamber was placed on stream. During this 30 minute period, steam at 900° F. was passed through the catalyst to remove the oxygen-containing gases, and afterwards the hydrocarbon vapors were again admitted.

On account of the relatively long period allowable for reactivation as described above and the flexibility of the process steps, the process is capable of numerous variations and modifications within the scope of the disclosure. No limitations are therefore implied except as defined by the appended claims.

I claim:

1. The process of reactivating a catalyst laden with combustible material including carbonaceous material from the conversion of organic material which comprises purging the catalyst by steam superheated to at least about 800° F., introducing sufficient air with said steam, the mixture being at at least about 800° F. to ignite said combustible material, stopping the flow of said mixture subsequent to the ignition, recirculating effluent combustion gases in greatly increased volume in the range of from about 800° to about 900° F. through the catalyst bed while adding sufficient air to support combustion and controlling combustion temperature below those causing catalyst deterioration, continuously bleeding off excess gases, introducing preheated air during the final stages of combustion to maintain the catalyst bed temperature above about 900° F., and finally purging oxygen from the reactivated catalyst by means of steam at at least about 800° F.

2. The process of reactivating a catalyst laden with combustible material including carbonaceous material from the conversion of organic material which comprises purging with steam at from about 800° to about 1000° F., igniting the catalyst by introducing a mixture of steam and air at from about 800° to about 1000° F. and containing not over about 10 volume percent of oxygen for a period of time sufficient to cause ignition of said combustible material, then initiating cooling and recycling of a portion of the effluent with addition of air in controlled amount under conditions such as to prevent the temperature in the catalyst from exceeding about 1400° F., until the combustion temperature drops to a predetermined level, continuously bleeding off excess gases, thereupon at least partially discontinuing said cooling until the circulated gas approaches air in oxygen content, discontinuing said recycling, purging with air at from about 800° to about 1000° F. to remove carbon oxide, and finally purging with steam at from about 800° to about 1000° F. to remove oxygen.

3. The process of reactivating a catalyst laden with combustible material including carbonaceous material from the conversion of organic material which comprises purging the catalyst with superheated steam at a temperature of from about 800° to about 1000° F. to purge substantially all volatile material therefrom, then initiating combustion by introducing a mixture of superheated steam and air at a temperature of from about 800° to about 1000° F. and containing sufficient oxygen to cause ignition but not over about 10% of oxygen by volume, discontinuing said introduction when the temperature of the effluent rises substantially above that of the introduced mixture, recycling a major portion of the effluent gas through a cooling zone to the catalyst and adding air to the recycled effluent in such manner as to maintain the temperature of combustion substantially above 900° F. but to prevent it from exceeding about 1400° F. and bleeding off the balance of the effluent to keep the circulating system gas volume and pressure substantially constant, when the temperature of the effluent falls to a predetermined level substantially below the maximum attained reducing the extent of cooling the recycled effluent to maintain the combustion temperature at at least about 900° F., thereafter when the recycled gas is substantially air discontinuing said air addition and said bleeding, to maintain the combustion temperature at at least about 900° F., discontinuing recycling, purging with air at from about 800° to about 1000° F. to remove substantially all carbon oxides, and finally purging with superheated steam at from about 800° to about 1000° F. to remove substantially all oxygen.

4. The process of reactivating a catalyst laden with combustible material including carbonaceous material from the conversion of organic material which comprises purging the catalyst with superheated steam at a temperature of from about 800° to about 1000° F. to purge substantially all volatile material therefrom, then initiating combustion by introducing a mixture of superheated steam and air at a temperature of from about 800° to about 1000° F. and containing sufficient oxygen to cause ignition but not over about 10% of oxygen by volume, discontinuing said introduction when the temperature of the effluent rises substantially above that of the introduced mixture, recycling a major portion of the effluent gas through a cooling zone to the catalyst and adding air to the recycled effluent in such manner as to maintain the temperature of combustion substantially above 900° F. but to prevent it from exceeding about 1400° F. and bleeding off the balance of the effluent to keep the circulating system gas volume and pressure substantially constant, when the temperature of the effluent falls to a predetermined level substantially below the maximum attained sufficiently reducing the extent of cooling the recycled effluent and introducing to the recycled effluent sufficient preheated air to maintain the combustion temperature at at least about 900° F., discontinuing said recycling, purging with air at from about 800° to about 1000° F. to remove substantially carbon oxides, and finally purging with superheated steam at from about 800° to about 1000° F. to remove substantially all oxygen.

5. The method of reactivating solid adsorbent contact catalysts of reduced activity due to combustible carbonaceous deposits accumulated during the catalytic conversion of hydrocarbons, which comprises purging hydrocarbons from the catalyst bed by means of steam superheated to temperatures of at least 800° F. in an auxiliary heating coil of relatively small capacity compared to the main reactivating gas stream, introducing sufficient air to said coil with said steam after substantially complete removal of hydrocarbons to ignite the combustible deposits, stopping the flow of gases through said auxiliary heating coil subsequent to the ignition, and recirculating combustion gases in greatly increased volume at temperatures in the range of 800 to 900° F. through the catalyst bed while adding sufficient air to support combustion and controlling combustion temperatures below those causing catalyst deterioration, continuously bleeding off excess gases, utilizing air preheated in said auxiliary heating coil again during the final stages of combustion to maintain the catalyst bed temperature above about 900° F., and finally purging oxygen-containing gas from the reactivated catalyst by means of steam supplied as in the initial purging operation.

6. The method as in claim 5 in which the gas volume provided by said auxiliary heating coil does not exceed about 25 per cent of the volume of combustion gas recirculated in the main combustion period.

7. In a process for the catalytic treatment of hydrocarbon oils over a solid adsorbent contact catalyst wherein said catalyst is relatively slowly deactivated by deposit thereon of combustible carbonaceous deposits, the step of reactivating said catalyst during a period of time not exceeding the conversion period by stopping the flow of hydrocarbons, passing steam superheated in an auxiliary preheater of relatively small capacity to a temperature in the neighborhood of the conversion temperature through the catalyst in the direction of hydrocarbon flow for a time substantially in excess of that required to purge readily volatile hydrocarbons from the catalyst space, introducing sufficient air through said preheater to ignite the combustible deposits on said catalysts with the combustion gases travelling in the same direction of the previous hydrocarbon flow, subsequent to the ignition recirculating combustion gases in relatively large volume back to the catalyst bed at a temperature above about 800° F., while adding sufficient oxygen to the recirculated gas to support the combustion and control the combustion temperature below values causing catalyst deterioration, continuously bleeding off excess gases, maintaining the temperature of the catalyst and the combustion gas stream during final stages of combustion by addition of preheated air from said auxiliary preheater, and finally purging oxygen-containing gas from the catalyst by means of steam superheated in said auxiliary preheater, whereby the recirculation of combustion gas in relatively large volumes is employed during only from about 50 to about 75 per cent of the reactivation period.

8. In a process for the catalytic treatment of hydrocarbon oils over a solid adsorbent contact catalyst wherein said catalyst is relatively slowly deactivated by accumulation thereon of combustible carbonaceous deposits, the step of reactivating said catalyst during a period of time not exceeding the conversion period which comprises stopping the flow of hydrocarbon vapors, purging the catalyst space by passing steam heated to near conversion temperature in an auxiliary preheater of relatively small capacity compared to the main reactivating gas stream for a period of time substantially in excess of that required for the removal of readily-volatile hydrocarbons, introducing sufficient air through said preheater to ignite the combustible deposits on the catalyst, subsequent to said ignition recirculating combustion gases in relatively much larger volume back to the catalyst bed at a temperature above about 800° F., while adding sufficient air to the recirculated gas to support combustion and control combustion temperatures below those causing catalyst deterioration, continuously bleeding off excess gases, maintaining the temperature of the catalyst bed and the combustion gas stream during the final stages of combustion by again adding air from said auxiliary preheater, and finally purging oxygen-containing gases from the catalyst by means of steam as in the initial purging step, whereby the recirculation of combustion gas in said relatively much larger volumes is employed during only a fraction of the reactivation period.

WALTER A. SCHULZE.

CERTIFICATE OF CORRECTION.

Patent No. 2,353,508. July 11, 1944.

WALTER A. SCHULZE.

It is hereby certified that error appears in the printed specification of the above numbered patent requiring correction as follows: Page 1, second column, line 10, for the word "unusually" read --usually--; and that the said Letters Patent should be read with this correction therein that the same may conform to the record of the case in the Patent Office.

Signed and sealed this 28th day of November, A. D. 1944.

Leslie Frazer (Seal)　　　　　　　　　　　Acting Commissioner of Patents.